June 26, 1951
A. G. HOWARD
2,558,179
APPARATUS FOR GASIFYING LIQUIDS
Filed March 1, 1945
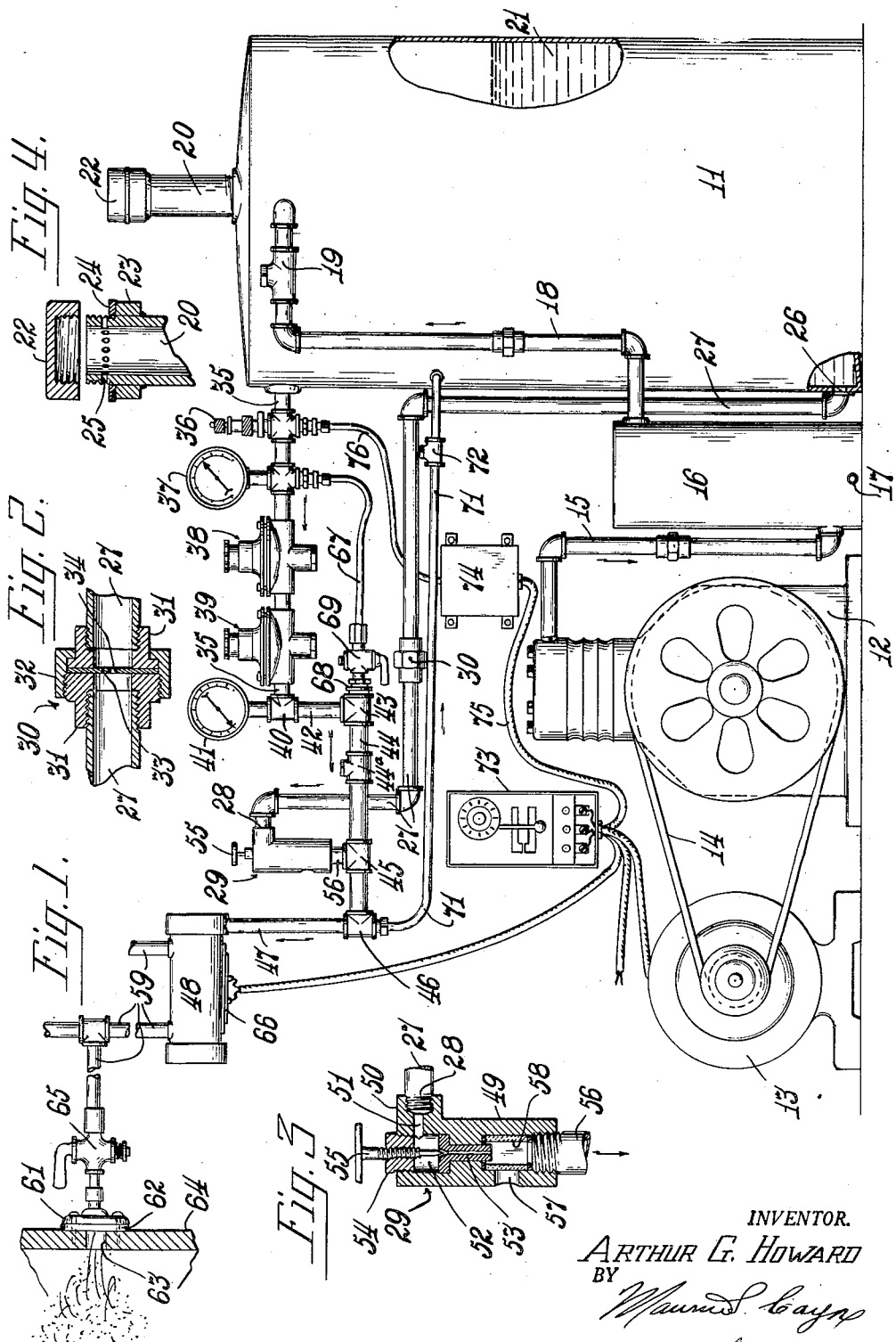
INVENTOR.
ARTHUR G. HOWARD
BY
ATTORNEY Patented June 26, 1951

2,558,179

UNITED STATES PATENT OFFICE 2,558,179

APPARATUS FOR GASIFYING LIQUIDS

Arthur G. Howard, Flint, Mich., assignor to Arrow Engineering & Chemical Company, Flint, Mich., a copartnership Application March 1, 1945, Serial No. 580,447

1 Claim. (Cl. 261—13)

The invention relates to improvements in the apparatus for gasifying a liquid and particularly to an improved apparatus for producing and discharging a gaseous insecticide or other like substance.

The apparatus disclosed is particularly useful for gasifying insecticide originally in liquid form, and the apparatus is intended primarily for the discharge of the gasified insecticide under pressure directly into bins of a kind used for the storage of flour or into containers of other food products. For example, flour and other food products cannot be treated with known insecticides in liquid form because of the damage resulting from a commingling of the liquid with the flour or other food products. It is, therefore, an object of the present invention to provide a gasification apparatus of the kind referred to which is particularly intended to effect complete gasification of a liquid insecticide and to discharge such gasified substances, under pressure, directly into the interior of a bin or bins containing the flour or other food product, so as to blanket the contents thereof.

The present apparatus for gasifying a liquid insecticide is useful in eliminating the action of mold spores prevalent in flour and dough handling machinery, and it is, therefore, another object of the present invention to provide a novel means for accomplishing this result.

Such treatment of the contents of storage bins or the like as has been described hereinabove preferably is performed at regular intervals and for predetermined periods of time. It is, therefore, another object of the present invention to provide a time controlled apparatus for producing and discharging a gasified substance, which is entirely automatic in operation and consequently may be rendered operative at any predetermined time or times and without interfering with customary usage of the bins or the like.

Another object is to provide an apparatus embodying a novel combination and association of interrelated units coordinated in operation so as to effect complete gasification of liquid insecticide, as distinguished from prior known machines operable to produce and discharge insecticide in the form of a fine stream or spray.

Another object of the invention is to provide an apparatus of the kind referred to which is not difficult to assemble and which is highly efficient in use and may be operated entirely automatically at low cost.

Other and further objects of the present invention will be apparent from the following description and claims and are illustrated in the accompanying drawings which, by way of illustration, show preferred embodiments of the principle thereof and which are considered to be the best mode contemplated for applying that principle. Other embodiments of the invention embodying the same principle may be used and structural changes may be made as desired by those skilled in the art without departing from the present invention and the purview of the appended claim.

In the drawings:

Fig. 1 illustrates a preferred form of the apparatus used for carrying out the present invention.

Fig. 2 is an enlarged fragmentary sectional detail view of a bleeder baffle used in the apparatus.

Fig. 3 is an enlarged longitudinal sectional detail view of the expansion valve used in the apparatus disclosed in Fig. 1.

Fig. 4 is an enlarged sectional detail view of the safety filler cap.

The embodiment of the apparatus disclosed in Figs. 1 to 4 inclusive, in the accompanying drawings and used in carrying out the present method for gasifying an insecticide or other liquid, includes a pressure tank 11, an air compressor 12 and a motor 13 for operating the compressor. The compressor 12 may be of any suitable type and is of sufficient capacity to create the air pressure necessary for efficient operation of the apparatus, and it preferably is operated by the motor 13 through a connecting belt 14 in the usual manner.

A pipe 15, connected at one end to the head of the air compressor 12, is connected at its other end with the lower end of a separator 16 which functions to remove moisture from the air passing therethrough. Water collected in the container may be withdrawn through a drain as at 17. Dry air leaving the separator 16 flows through a pipe line 18 into the upper end of the tank 11 and a check valve 19 is provided in said pipe line to prevent a reverse flow. The tank 11 is constructed to withstand an internal working pressure of between 50 to 75 pounds. A filling pipe 20 is provided on the top of the tank through which liquid insecticide 21 is admitted into the interior thereof. The level of the liquid 21 is always maintained below the level at which compressed air enters the tank through pipe 18 and the filling pipe 20 is suitably closed and hermetically sealed by a removable cap 22. The filling pipe 20 is, as best shown in Fig. 4, provided with an external collar 23 on its open upper end providing a seat for a sealing gasket 24 fitted thereon beneath the threaded closure cap 22. Preferably, the pipe is provided with holes 25 normally closed by the cap so as to allow the internal tank pressure to equalize with atmospheric pressure while the cap is being removed but before it is entirely disconnected from said pipe.

The structure described hereinabove is such that when the compressor 12 is operating, a pressure of from 50 to 75 pounds is constantly maintained upon the liquid 21. Consequently, the liquid is likewise maintained in the tank 11 under a corresponding pressure and will flow under such pressure from said tank 11 through any outlet provided therefor. Such an outlet is provided at 26 adjacent the lower end of tank 11, which outlet is suitably fitted with a conduit 27 connected, as at 28, to an expansion valve 29, the details of which will be described presently.

The liquid conduit 27 is provided between its ends with a flow reduction fitting 30. The reduction fitting 30 is best shown in Fig. 2 and may consist of the usual union fittings 31, carried on opposed sections of the conduit 27, suitably connected together in a leak proof joining as by a flanged internally threaded ring 32. Prior to securing the union fittings 31 together, a baffle 33, in the form of a circular plate having a port 34 therein of a diameter of about .013 inch, is interposed between said fittings and is accordingly firmly secured in place when said fittings are joined by the ring 32. The baffle 33 acts to reduce the volume of flow of liquid through the conduit 27 and consequently assists in maintaining the necessary pressure head within the tank 11.

A second or air outlet line 35 is connected to the upper end of and communicates with the interior of the tank 11 so that air contained under pressure in said tank may flow outwardly through the line 35. The line 35 includes a blow-off safety valve 36, a high pressure gauge 37, and a pair of regulators 38 and 39. The regulator 38 is of a type adapted to reduce the air pressure in the line 35 from high to medium and the other regulator reduces the air pressure in said line from medium to low. In this manner the flow of air through line 35 is effectively regulated while maintaining a pressure head within the tank 11. Air at reduced pressure leaving the regulator 39 through line 35 enters a T 40 having a low pressure gauge 41 fitted in one end thereof and a nipple 42 fitted into its other or lower end. The nipple 42 is connected, as by a T 43, with a low pressure air line 44 including a T 45 and an end fitting or T 46. A pipe 47, connected at one end into one end of the end T fitting 46, connects the low pressure air line with the interior of a manifold 48.

The air line construction, insofar as it has been described hereinabove, is such that air at a pressure equal to that within the tank 11 flows through the outlet line 35 past the pressure gauge 37 and into the regulator 38 where its pressure is suitably reduced, and then through the second regulator 39 which further reduces its pressure. The air under this reduced pressure is delivered to the manifold 48 and while flowing to said manifold through the line 44 it entrains minute particles of liquid insecticides delivered into said line 44 at the T 45 from the expansion valve 29.

The expansion valve 29 is best illustrated in Fig. 3 and it may consist of a housing 49 having an internal tapped boss 50 at its upper end to receive the threaded end 28 of the liquid conduit 27. A passageway 51 in said boss 50 connects with an internal bore 52 in the housing 49. The bore 52 terminates at its lower end in a reduced passageway having a tubular valve seat 53 therein and the upper end of said bore 52 is internally threaded to receive a fitting 54 having a valve stem 55 mounted therein for adjustment. It should be evident at this time that vertical adjustment of the valve stem 55 is effective to increase or decrease the rate of flow of liquid through the valve seat 53. In use, the valve stem 55 is so adjusted as to allow a very fine stream of liquid to pass through the valve seat 53. The liquid passing through said tubular valve seat is discharged into a nipple 56 fitted into the bottom of the housing 49 which nipple is connected to the T 45 in the air line 44. If desired, an opening 57 may be provided in the housing 49 to permit visual observation of the flow of the liquid into the nipple 56, a glass 58 being provided within said housing to guide the liquid as it flows past the opening 57.

The liquid, discharged in the form of a fine stream or trickle into the air stream flowing through the air line 44, is entrained by the air and is gasified and carried into the manifold 48 as distinguished from a stream or vapor usually obtained in well known types of spraying devices. The gaseous insecticide entering the manifold 48 is discharged therefrom through one or more lines 59, each of which is connected, as by a fitting 61 including a sealing gasket 62, through an opening 63 in a wall 64 of the bin or the like containing the flour, dough, or other material to be treated. The flow of gaseous insecticide into the bin or bins through any one or more outlet lines 59 may be controlled individually by means of a valve 65 provided in said line preferably adjacent the fitting 61. It has been found that the gases expanding in the manifold 48 assume very low temperatures, consequently a heater element such as the electric element 66 is associated with the manifold to minimize this condition.

Increased velocity and uniformity of air flow through the line 44 is assured by providing a bypass conduit 67 which is connected with the line 44 through reduction fittings 68 at T 43. This by-pass conduit receives its supply of air directly from the high pressure air line 35 at a point in advance of the regulator valves 38. A valve 69 is provided in this by-pass line 67 which valve, during normal operation of the apparatus, is but slightly open or "cracked." In practice it has been established that continued uniformity of the air flow through line 44 is best effected by the inclusion of the bypass line 67 and valve 69. Thus, should either regulator 38 or 39 cease to function for the purpose intended because, for example, of diaphragm failure, sufficient air will continue to flow through the bypass line 67 for continued operation of the apparatus.

When the apparatus is shut down after a period of use, the gaseous substance contained in the lines 47 and 59 and in the manifold 48 will condense. Means is therefore provided in the form of a bleeder or return line 71, connected at one end to the T 46 and at its other end with tank 11 so that such condensation may return to the body of liquid in said tank. A check valve 72 is provided in said return line 71 to limit the flow of liquid or air therein in one direction only.

It is one of the features of the present invention to provide means whereby the apparatus may be placed in operation automatically at predetermined periods of time and automatically put out of operation at selected intervals. The apparatus also is designed to prevent continued operation of the compressor 12 when the pressure within the tank 11 reaches the maximum necessary for efficient operation of the apparatus. Accordingly, means is provided in the form of a time control switch 73, which may be of any conventional construction, and which is suitably connected in the electrical circuit of the motor 13 in the usual manner. A pressure switch 74 also of conventional construction is connected through electrical conduit 75 with the control circuit in the time control switch 73. The pressure switch 74 is adapted for action in response to air pressure contained in the air line 35 and to this end an air conduit 76 connects the mechanism (not shown) of said pressure switch 74 with the air line 35 preferably at the safety valve 36. The arrangement just described is such that should the pressure in the line 35 exceed the maximum required for operation of the apparatus, such excessive pressure will immediately actuate the pressure switch 74 and break the circuit of the motor 13, irrespective of whether the time control switch 73 has run the limit of its predetermined period of time control. In use, the time control switch 73 may be set to close the electric circuit of the motor 13 and to maintain the circuit closed for a predetermined period of time, during which time the apparatus is maintained operative unless unexpected stoppage or other restriction in the air or liquid lines causes the pressure in the tank 11 to become excessive, whereupon the pressure switch 74 is immediately brought into action to prevent the building up of such excessive pressure as might result in damage to the apparatus.

Although a preferred form of apparatus for carrying out the principles of the invention has been illustrated in the accompanying drawings and described in detail herein, it should be understood that the illustrated arrangement of the various units constituting the apparatus is illustative only, and that the units may be arranged with respect to one another in such positions and locations as might be indicated by the conditions of a particular installation.

I claim:

An apparatus for producing and ejecting an insecticide gas comprising, in combination, a sealed container for a liquid insecticide, an outlet conduit connecting with said container below the level of the liquid therein, an air line for delivering air at a greater than atmospheric pressure into the said container above the level of liquid therein to force the liquid through said conduit, a baffle in said conduit to restrict the flow of liquid therethrough, a second conduit connecting said container above the liquid level with a distribution manifold, flow regulators in said second conduit, an expansion valve having its inlet connecting with said liquid conduit and its discharge communicating with the second conduit at a point between the flow regulators and manifold effective to discharge a fine stream of liquid into the air stream in said second conduit whereby the liquid is commingled with the air stream to produce a gaseous substance for delivery to said manifold, and means associated with the manifold to raise the temperature of the gaseous substance delivered thereto.

ARTHUR G. HOWARD.

REFERENCES CITED

The following references are of record in the file of this patent:

UNITED STATES PATENTS

| Number | Name | Date |
| --- | --- | --- |
| 650,276 | Robinson | May 22, 1900 |
| 1,607,830 | Kessel | Nov. 23, 1926 |
| 1,808,956 | Ketterer | June 9, 1931 |
| 1,894,607 | Carr | Jan. 17, 1933 |
| 1,939,949 | Bertram | Dec. 19, 1933 |
| 2,003,363 | Hodges et al. | June 4, 1935 |
| 2,004,001 | Henkle | June 4, 1935 |
| 2,022,266 | Yedd | Nov. 26, 1935 |
| 2,408,439 | Muehlhofer | Oct. 1, 1946 |
| 2,434,374 | Tull | Jan. 13, 1948 |